(12) United States Patent
Hoets et al.

(10) Patent No.: US 8,313,107 B2
(45) Date of Patent: Nov. 20, 2012

(54) ROLLING BOOT WITH TRANSITION REGION

(75) Inventors: Lukas Hoets, Duesseldorf (DE); Markus Deisinger, Siegburg (DE); Ralf Schumacher, Cologne (DE)

(73) Assignee: GKN Driveline International GmbH, Lohmar (DE)

( * ) Notice: Subject to any disclaimer, the term of this patent is extended or adjusted under 35 U.S.C. 154(b) by 0 days.

(21) Appl. No.: 12/977,944

(22) Filed: Dec. 23, 2010

(65) Prior Publication Data

US 2011/0092352 A1 Apr. 21, 2011

Related U.S. Application Data

(63) Continuation of application No. PCT/EP2008/006656, filed on Aug. 13, 2008.

(30) Foreign Application Priority Data

Jun. 27, 2008 (DE) .......................... 10 2008 030 150

(51) Int. Cl.
*F16J 3/00* (2006.01)
*F16J 15/52* (2006.01)
*F16C 1/26* (2006.01)
*F16D 3/84* (2006.01)

(52) U.S. Cl. .......................... 277/634; 277/635; 464/175

(58) Field of Classification Search .................. 277/634, 277/635; 464/173–175

See application file for complete search history.

(56) References Cited

U.S. PATENT DOCUMENTS

| | | | | |
|---|---|---|---|---|
| 3,255,838 A | * | 6/1966 | Goldman | 180/254 |
| 3,292,390 A | * | 12/1966 | Wildhaber | 464/158 |
| 4,145,896 A | * | 3/1979 | Pringle | 464/123 |
| 4,456,269 A | * | 6/1984 | Krude et al. | 277/636 |
| 5,772,521 A | * | 6/1998 | Herchenbach et al. | 464/170 |
| 5,879,238 A | * | 3/1999 | Breheret | 464/175 |
| 6,676,527 B2 | * | 1/2004 | Kudo et al. | 464/175 |
| 7,354,349 B2 | * | 4/2008 | Wette | 464/173 |
| 7,699,710 B2 | * | 4/2010 | Wette | 464/173 |
| 2008/0048400 A1 | * | 2/2008 | Dahlheimer | 277/391 |

FOREIGN PATENT DOCUMENTS

| | | |
|---|---|---|
| DE | 2242860 A1 | 3/1974 |
| GB | 2004028 A | 3/1979 |
| GB | 2107412 A | 4/1983 |
| JP | 11159538 A | 6/1999 |
| JP | 2005155886 A | 6/2005 |
| JP | 2006308075 A | 11/2006 |

OTHER PUBLICATIONS

PCT International Search Report for PCT EP 2008/006656 dated Mar. 5, 2009.

* cited by examiner

*Primary Examiner* — Vishal Patel
*Assistant Examiner* — Nicholas L Foster
(74) *Attorney, Agent, or Firm* — Rader, Fishman & Grauer, PLLC

(57) ABSTRACT

A rolling boot is proposed that has a first fastening region and a fold region with at least a first fold having a first fold peak region and a first fold flank near the first fastening region and, opposite this first fold flank, a second fold flank which is adjoined by a fold trough, wherein a transition region having a base surface is arranged between the first fastening region and fold region, and an angle a having a range from approximately 90° to approximately 140° is formed between the base surface and an outer side of the first fold flank, and the fold trough has a depth T which is, at most, approximately 65 percent of a height H of the first fold.

10 Claims, 2 Drawing Sheets

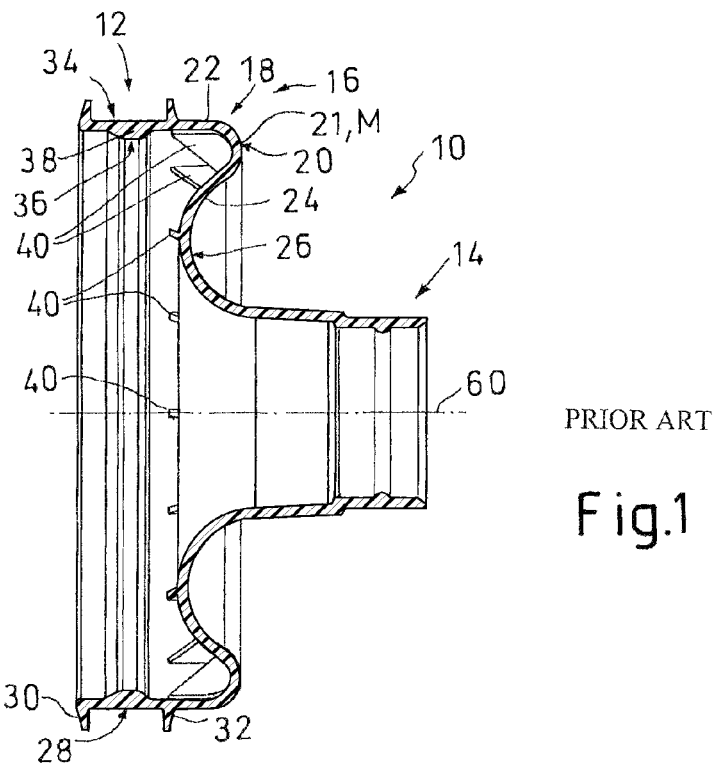
PRIOR ART
Fig.1
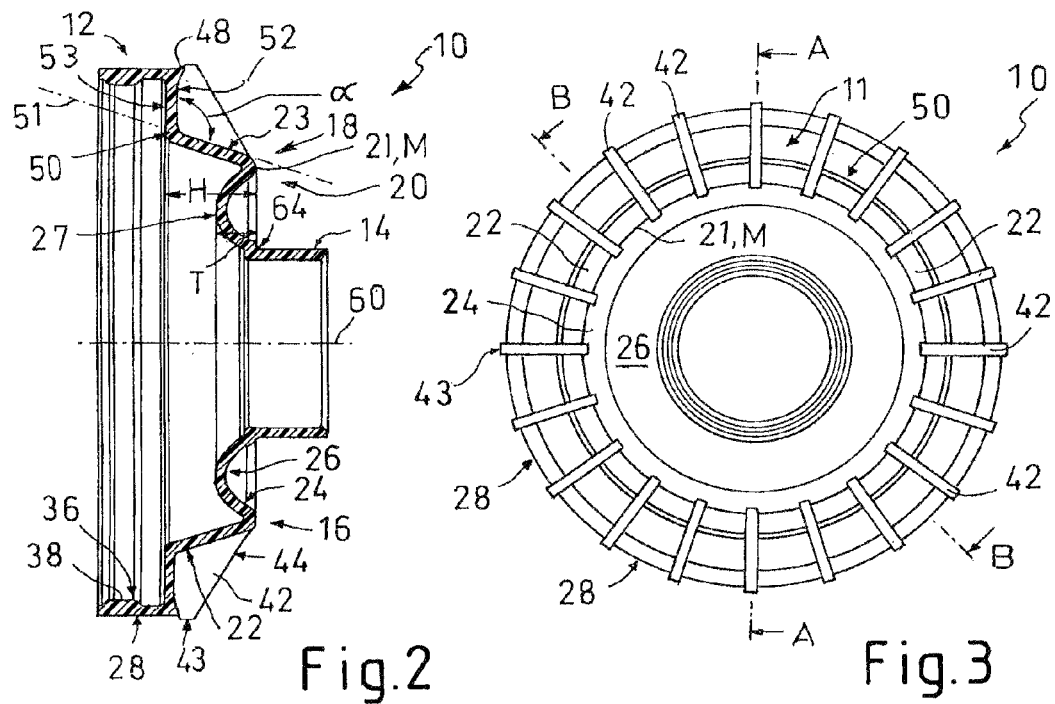
Fig.2
Fig.3

ROLLING BOOT WITH TRANSITION REGION

CROSS REFERENCE TO RELATED APPLICATIONS

This application is a Continuation Application claiming benefit of PCT/EP2008/006656, filed on Aug. 13, 2008, which claims priority to German Application No. 102008030150.7, filed on Jun. 27, 2008, which applications are hereby incorporated by reference in their entirety.

TECHNICAL FIELD

The disclosure relates to a rolling boot having a first fastening region and a fold region with at least a first fold having a fold peak region and a first fold flank close to the first fastening region and, opposite this first fold flank, a second fold flank which is adjoined by a fold trough.

BACKGROUND

Rolling boots are known from the prior art. For instance, FIG. 1 of the present application shows a section along a main axis 60 of a rolling boot according to the prior art having a first fastening region 12 intended for fastening to a joint housing and a second fastening region 14 intended for fastening to a shaft. Such a rolling boot, designated by the reference number 10 in FIG. 1, is mounted on fixed joints, for example. The first fastening region 12 here has an outer part 34 and an inner part 36, wherein an accumulation of material 38 in the form, for example, of a peripheral annular bead is arranged in the inner part 36 so as to provide a seat in a peripheral groove on the outer lateral surface of a housing part. The first fastening region 12 is adjoined by a fold region 16 having a first fold peak region 20 with a first fold flank 22 close to the fastening region 12 and, opposite this first fold flank, a second fold flank 24, the fold peak region 20 being adjoined by a fold trough 26. The fold peak region 20 has a fold peak 21 with a maximum M. Furthermore, the rolling boot 10 according to the prior art shown in FIG. 1 is provided in its interior with reinforcing ribs 40 which are arranged in the fold region 16.

FIG. 4 of the present application shows a boot 10 according to FIG. 1 mounted on a housing part 54 of a fixed joint. The housing part 54 has an outer lateral circumferential surface 70 and also a peripheral end surface 68, between which surfaces a peripheral edge 55 is arranged. The boot 10 is mounted on the joint housing part 54 by a first fastening means 58, and on a shaft 56 in a second fastening region 14 using a second fastening means 62. The first fastening element 58 and also the first fastening region 12 of the boot 10 are in this case completely assigned to the outer lateral circumferential surface 70 of the joint housing part 54, or to the joint housing part 54 itself, and the first fastening region 12 is directly followed by a fold region 16 having exactly one fold in the example shown in FIG. 1 and FIG. 4.

A particular disadvantage with rolling boots according to the prior art as shown in FIGS. 1 and 4 is that they have a large overall height, although it is the case, for example in automobiles in which such rolling boots can be used, that the space requirements are very restricted and it is sought to obtain a reduction in the size of the components used while maintaining at least equally good properties. Furthermore, the rolling boot in FIGS. 1 and 4 has a relatively high stiffness on account of the specific design of the fold region with an inner set of ribs. This is necessary to withstand the high centrifugal forces which prevail and hence to withstand the grease pressure acting on the rolling boot.

Therefore, there exists a need for a rolling boot which may withstand the grease pressure acting on it.

SUMMARY

A rolling boot as defined in the introductory paragraph is disclosed herein. An exemplary configuration of a boot comprises a transition region having a base surface between the first fastening region and the fold region, wherein an angle a having a range from approximately 90°, preferably above 91°, to approximately 110°, preferably approximately 100° to approximately 103°, with further preference approximately 108° to approximately 120°, is formed between the base surface and an outer side of the first fold flank, and the fold trough has a depth T which is at most approximately 65 percent of a height H of the first fold.

The rolling boot according to the disclosure has one exemplary advantage that, by virtue of its specific geometry, it is of compact design and additionally has a reduced inside diameter, thereby reducing the grease pressure acting on the rolling boot when it is exposed to centrifugal forces. In addition, contact between the fold trough following the first fold and a housing part is reliably avoided in operation owing to the geometry selected according to the disclosure.

The transition region of the rolling boot according to the disclosure is here designed to at least partially extend substantially approximately perpendicularly in relation to the main axis of the rolling boot, i.e. both the inner base surface and the outer base surface thereof extend perpendicularly to the main axis of the rolling boot. However, provision can also be made for the transition region to have an angled design in relation to the main axis of the rolling boot. The transition region may be configured with a uniform material thickness. Further, the fold region with the first fold and the adjoining fold trough together, if appropriate, with further elements thereof likewise may be configured with a uniform material thickness, and, in one exemplary configuration, the material thickness of the fold region corresponds to that of the transition region.

The rolling boot according to the disclosure can be produced from a large number of different materials. For example, such suitable materials may include a thermoplastic elastomer material based on polyurethane (TPU), polyamide (TPA), polyolefin (TPO), polyester (TPEE), from a thermoplastic elastomer vulcanizate (TPV) or from a thermoplastic polyetherester elastomer (TEE). The folding boot material here can also contain other ingredients, in particular additives for promoting diffusion or the like. Alternatively, it is also possible to use an elastomeric material as boot material, although thermoplastic elastomer materials are preferred. A known thermoplastic elastomer material for producing boots is marketed under the trade name "Hytrel" by DuPont Company. However, provision can also be made for at least parts of the rolling boot to be produced from different materials; for example, the first and/or second fastening region can also contain an elastomeric material in addition to a thermoplastic elastomer material. Furthermore, it is also possible within the context of the present disclosure to use mixtures of the various thermoplastic elastomers or elastomer materials.

The folding boot according to the disclosure may be produced using the injection molding process or press-blow injection extrusion process. However, other production processes known to a person skilled in the art are also possible, although the two processes explicitly mentioned above can be used to obtain boots having a particularly precise geometry.

In one exemplary configuration, the boot has at least two outer ribs which, at least in parts, bridge the first fastening region and the transition region, with respect to a direction perpendicular to the main axis of the boot. Moreover, a plurality of outer ribs may be arranged uniformly, in particular regularly, i.e. at an identical distance from one another, on an outer circumferential surface of the boot. The outer ribs may also be arranged in opposite pairs. Thus, it can be provided that the boot according to one exemplary configuration, has five to fifteen pairs of outer ribs, i.e. a total of ten to thirty outer ribs, with further preference eight to twelve outer rib pairs, i.e. sixteen to twenty four outer ribs. The outer ribs provide the rolling boot with sufficient structural rigidity to withstand the centrifugal forces to which it is exposed.

The outer rib may be configured with a first outer edge which is directed away from the outer circumferential surface of the rolling boot. In a one exemplary embodiment, the first outer edge of the outer rib here starts approximately in the fold peak region of the first fold, with further preference exactly at the fold peak, i.e. the maximum of the first fold, and moreover preferably extends linearly and at an angle to the main axis of the rolling boot. However, provision can also be made for the first outer edge to have another design, for example to be curved.

In a further exemplary embodiment of the present disclosure, at least one of the outer ribs protrudes beyond a base surface of the first fastening region to form a positioning and/or bearing surface. The first fastening region constitutes a clamping seat surface for a fastening element, for example a clamping strap, a clamp or a compression ring. However, other fastening elements known to a person skilled in the art can also be used within the context of the present disclosure. The specific design of at least one of the outer ribs, preferably at least half the number of outer ribs, with further preference all the outer ribs, serves to facilitate the positioning of this fastening element in the first fastening region, it additionally being the case that the fastening element can also bear by way of its peripheral side edge, at least partially against the bearing surface formed by the at least one outer rib, i.e. is in direct contact with this bearing surface. Here, contact does not have to be made by the entire side face of the fastening element with respect to the overall height or thickness of the fastening element. Rather, the positioning and/or bearing surface can also only be at most approximately 90 percent, with further preference at most approximately 60 percent, of the overall height of the fastening element. The fastening element will, in this case, protrude beyond the positioning and/or bearing surface. The positioning and/or bearing surface is designed to be substantially perpendicular in relation to the main axis of the rolling boot, and is part of an offset which is arranged between that end of the first outer edge of the outer rib facing the first fastening region and the positioning and/or bearing surface. Here, this offset may be configured to form a second outer edge of the at least one outer rib, which edge, in one exemplary configuration, may be oriented substantially parallel to the main axis of the rolling boot, and is part of the rib in question. However, provision can also be made here for this second outer edge of the at least one outer rib to have a slightly angled design, with respect to the main axis of the rolling boot, the angle between the second outer edge and the main axis of the rolling boot preferably being smaller than that angle which is defined between the first outer edge of the at least one outer rib and the main axis of the rolling boot.

In yet another exemplary embodiment of the rolling boot according to the disclosure, the fold trough following the first fold is of symmetrical design, and is preferably designed substantially as a semicircle, with respect to a cross section in the direction of the main axis of the boot. In one exemplary configuration, the fold trough following the first fold is followed by the second fastening region of the rolling boot according to the disclosure. In this case, the first fold trough is defined by the fold peak of the first fold and the side region, near the fold trough, of the second fastening region which can be formed, for example, by an offset.

In a further exemplary embodiment of the present disclosure, the base surface of the first fastening region, which in particular makes available a seat for a fastening element, is displaced axially with respect to a housing part and displaced with respect to the main axis of the boot in such a way that the base surface at least partially projects beyond an edge of the housing part. The housing part here can in particular be made available by a joint. In one exemplary arrangement, the joint is a fixed joint. The clamping seat surface here may be smaller than the base surface of the first fastening region, but can also be identical to it. In another exemplary configuration, the projecting length of the base surface is situated in a range from approximately 20 percent to approximately 45 percent, and in one specific exemplary configuration, approximately 24 percent to approximately 35 percent, of a width of the first fastening element. By virtue of the aforementioned embodiments, the resulting still only partial overlapping of the clamping seat surface and the outer lateral surface of the joint part provides the binder element with a supporting function in addition to the sealing function, since, as a result, the deformation of the rolling boot is reduced when exposed to centrifugal forces and thus the rotational speed stability is improved during operation. If, however, the projecting length is chosen to be too high, the sealing action will be impaired and an instability of the binder seat will additionally be caused, while if the projecting length is chosen to be too low, the supporting effect for the rolling boot will be excessively reduced and, consequently, no improvement will ultimately be achieved in the rotational speed stability during the operation of the rolling boot. As already mentioned above, the boot according to the disclosure is particularly useful in fixed joints. However, the boot can also be arranged on any other type of joints, for example on ball joints, or else in pushrods, for sealing tube ends or other housing parts, in order to provide adequate sealing and an additional supporting function. The present disclosure is thus not restricted in terms of the type of housing parts on which the boot can be mounted. Housing parts which are applicable here are, for example, also tube ends of any type, pushrods, shafts or the like, and also joints and their outer joint housing.

Furthermore, the present disclosure relates to a system comprising a housing part, which may be part of a joint, such as part of a fixed joint or a joint itself, and of a rolling boot as defined above. In one exemplary configuration, the system comprises at least a first fastening element, although at least a second fastening element for fastening the rolling boot in a second fastening region may also be included, in particular on a shaft. The first fastening element bears, at least by way of a portion of a side face, against the positioning and/or bearing surface of at least one rib. The side face of the fastening element may protrude beyond the positioning and/or bearing surface of the rib. The base surface of the first fastening region, which base surface makes available a seat surface for the fastening element, is displaced axially with respect to the housing part and displaced with respect to the main axis of the boot in such a way that the base surface at least partially projects beyond an edge of the housing part. The projecting length of the base surface here is preferably situated in a range from approximately 20 percent to approximately 45 percent, though ranges from approximately 24 percent to approximately 35 percent is also contemplated, of a width of the first fastening element.

BRIEF DESCRIPTION OF DRAWINGS

These and further advantages of the present disclosure will be explained in more detail with reference to the following figures, in which:

FIG. 1 shows a cross section along a main axis of a rolling boot according to the prior art;

FIG. 2 shows a cross section on a line B-B in FIG. 3 along a main axis of a rolling boot according to an embodiment of the disclosure;

FIG. 3 shows an outer view of a rolling boot according to an embodiment of the disclosure as shown in FIG. 2;

DETAILED DESCRIPTION

It should be stated first of all that the features shown in the figures are not restricted to the individual embodiments. Rather, the features in each case shown and indicated in the description, including the description of the figures, can be combined with one another so that they can be developed. Identical features, including those from the prior art, are designated here by the same references. In particular, the subject of the present disclosure is not restricted to the embodiment, shown in the figures, of the system according to the disclosure for a fixed joint. Rather, the present disclosure can be applied to rolling boots which are mounted on whatever parts for sealing purposes. In particular, it is also neither envisioned nor intended to restrict the disclosure to fixed joints in automobiles; rather, the rolling boots according to the disclosure can be used in a large number of application areas. Finally, it is also possible, in particular, to design the fold region in such a way that, if appropriate, second or other further folds can also be provided. These second or further folds can then adjoin the fold trough following the first fold, or follow the first fold, in which case the fold trough would be arranged between the first fold peak near the first fastening region and the second fold peak of the subsequent fold.

FIG. 1 shows a folding boot according to the prior art already described in the background section, this boot having in its interior a plurality of inner ribs 40 arranged in the fold region 16 in order to achieve a sufficient degree of rigidity. It is clearly evident from FIG. 1 that the folding boot 10 according to the prior art shown therein is relatively bulky.

Figure 4:
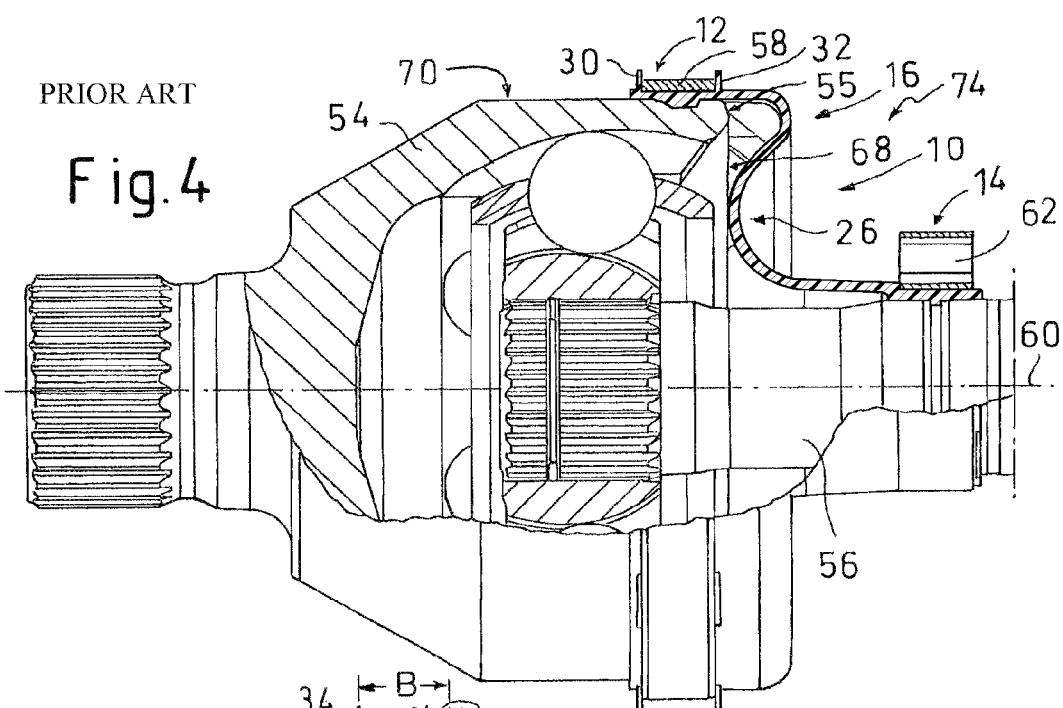
FIG. 4 shows a sectional view through a system according to the prior art, comprising a housing part of a fixed joint, a rolling boot in accordance with FIG. 1, a shaft and first and a second fastening mechanism.

FIG. 4 shows the folding boot 10 according to the prior art as shown in FIG. 1 mounted on a fixed joint housing having a housing part 54 with an outer lateral circumferential surface 70 and a shaft 56, the folding boot 10 being mounted in the first fastening region 12 on the housing part 54 using a first fastening element 58 and in the second fastening region 14 on the shaft 60 using a second fastening element 62. This forms an overall system 74. The first fastening region 12 receives over its full surface the first fastening element 58, which comes to lie between a first retaining element 30 and a second retaining element 32. The first and second retaining elements 30 or 32 in this embodiment of a boot 10 according to the prior art can here be embodied as peripheral webs, but also as interrupted webs, for example also in the form of "ear webs", which have a rounded outer contour as viewed in a direction perpendicular to the main axis 60 of the boot 10. In the embodiment of the system 74 as shown in FIG. 4, in this case the base surface 28 of the first fastening region of the boot 10 is identical to the clamping seat surface.

It is clearly evident from FIG. 4 that the first fastening region, and hence also the base surface 28 thereof, does not project beyond a housing edge 55 which is arranged in the transition from the outer lateral circumferential surface 70 to a peripheral end surface 68 of the housing part 54. It is additionally evident from FIG. 4 that the fold trough 26 is in contact with the peripheral end surface 68 of the joint housing 54.

Figure 5:
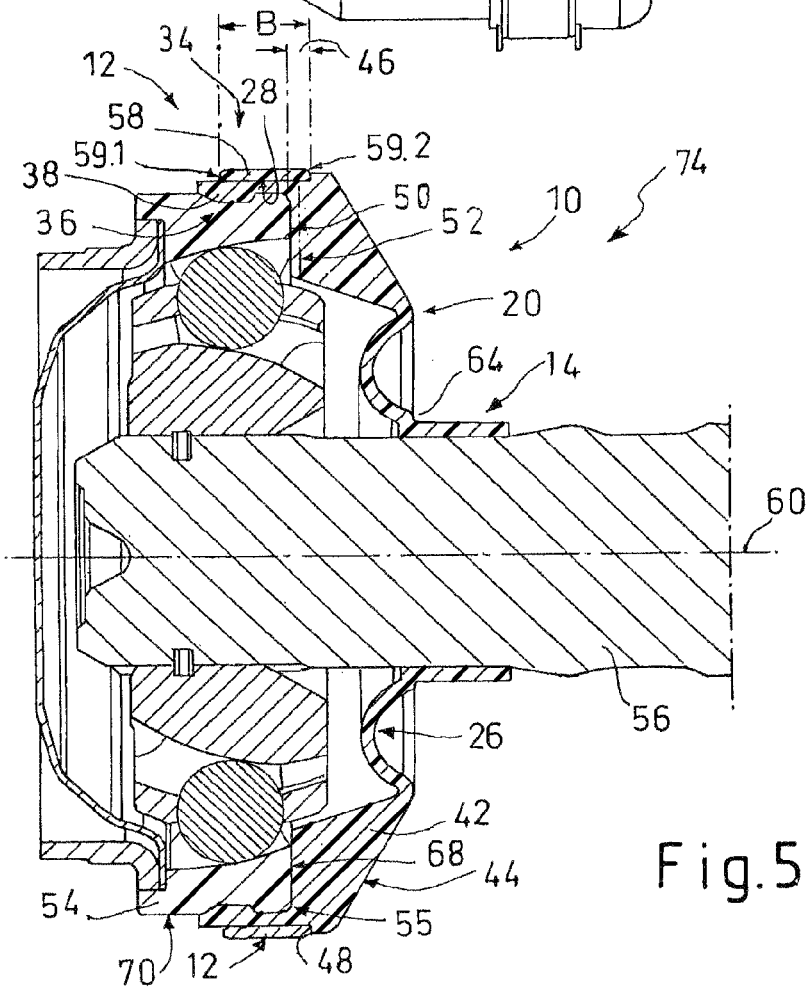
FIG. 5 shows a cross section on a line A-A in FIG. 3 through a system according to the disclosure comprising a joint housing, a folding boot according to FIGS. 2 and 3 and a first fastening mechanism for fastening the folding boot to the housing part.

FIG. 2 now shows a folding boot 10 according to the present disclosure with a first fastening region 12 and a second fastening region 14, wherein an interior 36 of the boot 10 is assigned, in the first fastening region 12, an accumulation of material 38, formed as a peripheral annular bead, which can engage in a corresponding peripheral annular groove on a housing part (see FIG. 5 in this respect). The first fastening region 12 makes available a base surface 28 which has a greater width than the width of a fastening element 58, as can be seen from FIG. 5. The first fastening region is adjoined by a transition region 50 with an outer base surface 52 and an inner base surface 53. In the example shown here, this transition region is designed in such a way that it extends substantially perpendicularly to a main axis 60 of the boot 10, and moreover bears against the outer peripheral end surface 68 of the housing part 54 or is arranged close to it, as can also be seen from FIG. 5. Following the transition region 50 is provided a fold region 16 which has a first fold 18 with a first fold flank 22 near the first fastening region 12 and, opposite this first fold flank, a second fold flank 24. The first fold 18 here has a fold peak region 20 with a fold peak 21 and a maximum M. The first fold 18 is followed by a fold trough 26 which is subsequently directly adjoined by the second fastening region 14.

Furthermore, the boot according to the disclosure as shown in FIG. 2 has an outer rib 42 with a first outer edge 44, which starts at the maximum M of the fold peak region, i.e. at the fold peak 21, and a second outer edge 43 which extends substantially parallel to the main axis 60 of the boot 10. The outer rib 44 here makes available a bearing and/or positioning surface 48 for the fastening element 58 (see FIG. 5). For this purpose, the outer rib 42 protrudes somewhat beyond the base surface 28 of the first fastening region 12, with the result that the second outer edge 43 also protrudes beyond the base surface 28 and in so doing is formed substantially parallel to this surface.

An angle α, which is approximately 110°, is formed between the outer base surface 52 and an outer side 23 of the first fold flank 22 of the fold 18. In principle, the angle a within the context of the present disclosure is measured between an outer base surface 52 of the transition region 50 and an outer side 23 of a first fold flank 22 of the first fold 18.

It is also evident from FIG. 2 how a height H of the first fold 18 within the context of the present disclosure is determined. This involves measuring the region between a tangent extending through the maximum M or the fold peak 21 of the first fold 18, this tangent being oriented perpendicularly to the main axis 60 of the boot 10, and an inner base surface 53 of the transition region 10. Since this base surface in the exemplary embodiment is likewise oriented perpendicularly to the main axis 60 of the boot 10, the tangent extending through the fold peak 21 or the maximum M of the first fold 18 extends parallel to this inner base surface 53 of the transition region 50. However, provision can also be made for the inner base surface 53 of the transition region 50 to be arranged at an angle in relation to the main axis 60 of the rolling boot 10.

In the context of the present disclosure, the depth T of the fold trough 26 is determined by measuring the region between a tangent extending on an inner base surface 27, i.e. the minimum of the fold trough 26 directed toward the interior of the boot 10, and perpendicularly to the main axis 60 of the boot 10, and that tangent which extends through the fold peak 21 or the maximum M of the first fold 18 and perpendicularly to the main axis 60 of the boot 10. Since both tangents thus extend parallel and perpendicularly to the main axis 60 of the boot 10, the depth T can be determined simply.

As can be seen from FIG. 2, the depth T is approximately 42 percent of the height H.

FIG. 3 firstly shows the line B-B along which the section of the boot 10 visible in FIG. 2 has been taken. Furthermore, FIG. 3 shows particularly clearly that a plurality of outer ribs 42, more precisely a total of ten rib pairs 42, that is to say a total of twenty outer ribs 42, are arranged on an outer circumferential surface 11 of the boot 10. It can also be clearly seen that the outer ribs 42 fractionally protrude beyond the base surface 28 of the first fastening region 12 so as to form a bearing and positioning surface 48, the outer edge 43 for this purpose being indicated in FIG. 3 to make this clear.

FIG. 5 now shows a system 74 according to the disclosure, comprising a boot 10 as shown in one of FIGS. 2 and 3 and also a housing part 54, here belonging to a fixed joint, together with a first fastening element 58. FIG. 5 also shows a shaft 56. The housing part 54 has an outer lateral circumferential surface 70 and an outer peripheral end surface 68, between which surfaces is arranged a housing edge 55. The fastening element 58 has a first side face 59.1 and a second side face 59.2, which, in one embodiment of the fastening element 58, for example as a compression ring, are to be regarded as peripheral side faces. Not shown in FIG. 5 is a second fastening element 62 which serves to fasten the boot 10 on the shaft 56 in the second fastening region 14. In the second fastening region can be clearly seen an offset 64 at which the fold trough 26 merges into the second fastening region 14. The offset 64 here is designed to be peripheral so as to produce a bearing and/or positioning surface for a second fastening element 62, not shown in FIG. 5. Moreover, the section through the system 74, with respect to the boot 10, has been taken along a line A-A in FIG. 3.

In the system 74 according to the disclosure shown in FIG. 5, the fastening element 58 projects beyond the housing edge 55 by a projecting length 46. This projecting length 46 is determined by the outer circumferential end surface 68 of the housing part 54 on the one hand and, on the other hand, by the bearing and/or positioning surface 48, made available by the outer rib 42. This projecting length 46 is a portion of the base surface 28, but also of the clamping seat surface, of the first fastening region 12. FIG. 5 also shows the width B of the fastening element 58 determined by the two outer side faces 59.1 and 59.2 thereof. The projecting length 46 here is somewhat more than 25 percent of the width of the first fastening element 58.

What is claimed is:

1. A rolling boot for a joint comprising a first fastening region and a fold region with at least a first fold having a fold peak region and a first fold flank near the first fastening region and, opposite this first fold flank, a second fold flank which is adjoined by a fold trough, wherein a transition region having a base surface is arranged between the first fastening region and the fold region and an angle having a range from approximately 90° to approximately 140° is formed between the base surface of the transition region and an outer side of the first fold flank, and the fold trough has a depth which is at most approximately 65 percent of a height of the first fold; wherein the depth is measured between a tangent of the fold trough extending perpendicular to a main axis of the boot and a tangent of the fold peak extending perpendicular to the main axis, and the height is measured between the base surface of the transition region and the tangent of the fold peak extending perpendicular to the main axis; wherein the rolling boot further comprising a cylindrical first fastening element for fastening the boot to a housing part, and a base surface on the outer periphery of the first fastening region defines a seat for the first fastening element, the base surface of the first fastening region oriented to extend axially with respect to the housing part and displaced with respect to the main axis of the boot such that the base surface of the first fastening region extend axially such that the seat for the first fastening element and the first fastening element overlap and at least partially projects axially beyond an end surface of the housing part and axially beyond the base surface of the transition region, wherein at least two outer ribs bridge, at least in part, the first fastening region and the transition region, with respect to a direction perpendicular to the main axis of the boot, and wherein the first fastening element bears at least by way of a portion of a side face against a bearing surface of at least one rib.

2. The rolling boot as claimed in claim 1, wherein a plurality of outer ribs are arranged with a uniform distribution on an outer circumferential surface of the boot.

3. The rolling boot as claimed in claim 1, wherein at least one of the ribs protrudes beyond a base surface of a first fastening region to form the bearing surface.

4. The rolling boot as claimed in claim 1, wherein the rib has a first outer edge which starts approximately at a maximum of the fold peak region.

5. The rolling boot as claimed in claim 1, wherein the fold trough is of symmetrical design.

6. The rolling boot as claimed in claim 1, wherein the fold trough substantially forms a semicircle, with respect to a cross section in the direction of the main axis of the boot.

7. The rolling boot as claimed in claim 1, wherein the transition region at least partially extends substantially parallel to an outer surface of the housing part.

8. The rolling boot as claimed in claim 1, wherein a projecting length of the seat beyond the end surface of the housing part is situated in a range from approximately 20 percent to approximately 45 percent of a width of the first fastening element.

9. A system comprising a housing part and a roll boot fir a joint, wherein the roll boot further comprises: a first fastening region and a fold region with at least a first fold having a fold peak region and a first fold flank near the first fastening region and, opposite this first fold flank, a second fold flank which is adjoined by a fold trough, wherein a transition region having a base surface is arranged between the first fastening region and the fold region and an angle having a range from approximately 90° to approximately 140° is formed between the base surface of the transition region and an outer side of the first fold flank, and the fold trough has a depth which is at most approximately 65 percent of a height of the first fold; wherein the depth is measured between a tangent of the fold trough extending perpendicular to a main axis of the boot and a tangent of the fold peak extending perpendicular to the main axis, and the height is measured between the base surface of the transition region and the tangent of the fold peak extending perpendicular to the main axis; wherein the rolling boot further comprising a cylindrical first fastening element fastening the boot to the housing part, and a base surface on the outer periphery of the first fastening region defines a seat of the first fastening element, the base surface of the first fastening region oriented to extend axially with respect to the housing part and displaced with respect to the main axis of the boot such that the base surface of the first fastening region and the first fastening element overlap and at least partially project axially beyond an end surface of the housing part, wherein at least two outer ribs bridge, at least in part, the first fastening region and the transition region, with respect to a direction perpendicular to the main axis of the boot, and wherein the first fastening element bears at least by way of a portion of a side face against a bearing surface of at least one rib.

10. The system as claimed in claim 9, wherein the side face of the first fastening element protrudes beyond the bearing surface of the rib.

* * * * *

UNITED STATES PATENT AND TRADEMARK OFFICE
CERTIFICATE OF CORRECTION

PATENT NO. : 8,313,107 B2
APPLICATION NO. : 12/977944
DATED : November 20, 2012
INVENTOR(S) : Lukas Hoets et al.

Page 1 of 1

It is certified that error appears in the above-identified patent and that said Letters Patent is hereby corrected as shown below:

At column 8, claim number 9, line number 51, please change fir to for

At column 8, claim number 9, line number 62, please change [[;]] to .

Signed and Sealed this
Twenty-sixth Day of February, 2013

Teresa Stanek Rea
*Acting Director of the United States Patent and Trademark Office*